US011836145B2

(12) United States Patent
Huo et al.

(10) Patent No.: US 11,836,145 B2
(45) Date of Patent: Dec. 5, 2023

(54) METHOD AND SYSTEM FOR THE ENGRAMIC INDEXING OF INFORMATION TECHNOLOGY INFRASTRUCTURE

(71) Applicant: EMC IP Holding Company LLC, Hopkinton, MA (US)

(72) Inventors: Jiale Huo, Ontario (CA); Brad Corey Maltz, Douglas, MA (US); Hanna Yehuda, Newton, MA (US); Nicole Reineke, Northborough, MA (US); Charles Joseph Williams, Sherborn, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 342 days.

(21) Appl. No.: 16/778,215

(22) Filed: Jan. 31, 2020

(65) Prior Publication Data

US 2021/0240704 A1    Aug. 5, 2021

(51) Int. Cl.
*G06F 16/2458* (2019.01)
*G06F 9/54* (2006.01)
*G06F 16/22* (2019.01)
*G06F 9/50* (2006.01)
*G06F 16/2453* (2019.01)

(52) U.S. Cl.
CPC ............ *G06F 16/2471* (2019.01); *G06F 9/54* (2013.01); *G06F 16/2228* (2019.01)

(58) Field of Classification Search
None
See application file for complete search history.

(56) References Cited

U.S. PATENT DOCUMENTS

| | | | |
|---|---|---|---|
| 2012/0215791 A1* | 8/2012 | Malik | G06F 16/24578 707/E17.084 |
| 2014/0089246 A1* | 3/2014 | Adriaansen | G06F 16/313 706/46 |
| 2015/0163461 A1* | 6/2015 | Eustice | G06F 18/25 348/77 |
| 2017/0185671 A1* | 6/2017 | Zhao | G06F 16/3347 |
| 2018/0157486 A1* | 6/2018 | Bezzi | G06F 8/71 |
| 2019/0294669 A1* | 9/2019 | Mohan | G06F 40/30 |

OTHER PUBLICATIONS

Mason McDaniel; Content Based File Type Detection Algorithms; IEEE; 2002; pp. 1-10 (Year: 2002).*

* cited by examiner

*Primary Examiner* — Albert M Phillips, III
*Assistant Examiner* — Jermaine A Mincey
(74) *Attorney, Agent, or Firm* — Chamberlain, Hrdlicka, White, Williams & Aughtry

(57) ABSTRACT

A method and system for engramic indexing of information technology (IT) infrastructure. Specifically, the method and system disclosed herein enable the efficient access, search, and/or management of enterprise-scale IT infrastructure and topologies using semantic context and natural language processing. That is, query context may be optimized using mapped semantics based on organizational constructs and machine learning, thereby reducing query overhead, increasing response performance, and improving contextual display capabilities in mass-scale environments.

20 Claims, 7 Drawing Sheets

METHOD AND SYSTEM FOR THE ENGRAMIC INDEXING OF INFORMATION TECHNOLOGY INFRASTRUCTURE

BACKGROUND

When considering enterprise-scale information technology infrastructure, the overhead involved in the current search and/or management of multiple datacenters may be extensive.

SUMMARY

In general, in one aspect, the invention relates to a method for processing queries. The method includes receiving an input query from a query device, generating a query semantic fingerprint for the input query, computing a first similarity metric between the query semantic fingerprint and a first datacenter semantic fingerprint, making a first determination that the first similarity metric satisfies a similarity metric threshold, identifying, based on the first determination, a first datacenter represented through the first datacenter semantic fingerprint, and obtaining, in response to the input query, a first resource from the first datacenter.

In general, in one aspect, the invention relates to a non-transitory computer readable medium (CRM). The non-transitory CRM includes computer readable program code, which when executed by a computer processor, enables the computer processor to receive an input query from a query device, generate a query semantic fingerprint for the input query, compute a first similarity metric between the query semantic fingerprint and a first datacenter semantic fingerprint, make a first determination that the first similarity metric satisfies a similarity metric threshold, identify, based on the first determination, a first datacenter represented through the first datacenter semantic fingerprint, and obtain, in response to the input query, a first resource from the first datacenter.

In general, in one aspect, the invention relates to a system. The system includes a plurality of datacenters, and an engramic indexing service operatively connected to the plurality of datacenters. The engramic indexing service includes a first computer processor, is programmed to receive an input query, generate a query semantic fingerprint for the input query, compute a similarity metric between the query semantic fingerprint and a datacenter semantic fingerprint, make a determination that the similarity metric satisfies a similarity metric threshold, identify, based on the determination, a datacenter of the plurality of datacenters, represented through the datacenter semantic fingerprint; and obtain, in response to the input query, a resource from the datacenter.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for engramic indexing of information technology (IT) infrastructure. Specifically, one or more embodiments of the invention enables the efficient access, search, and/or management of enterprise-scale IT infrastructure and topologies using semantic context and natural language processing. That is, query context may be optimized using mapped semantics based on organizational constructs and machine learning, thereby reducing query overhead, increasing response performance, and improving contextual display capabilities in mass-scale environments.

Figure 1:
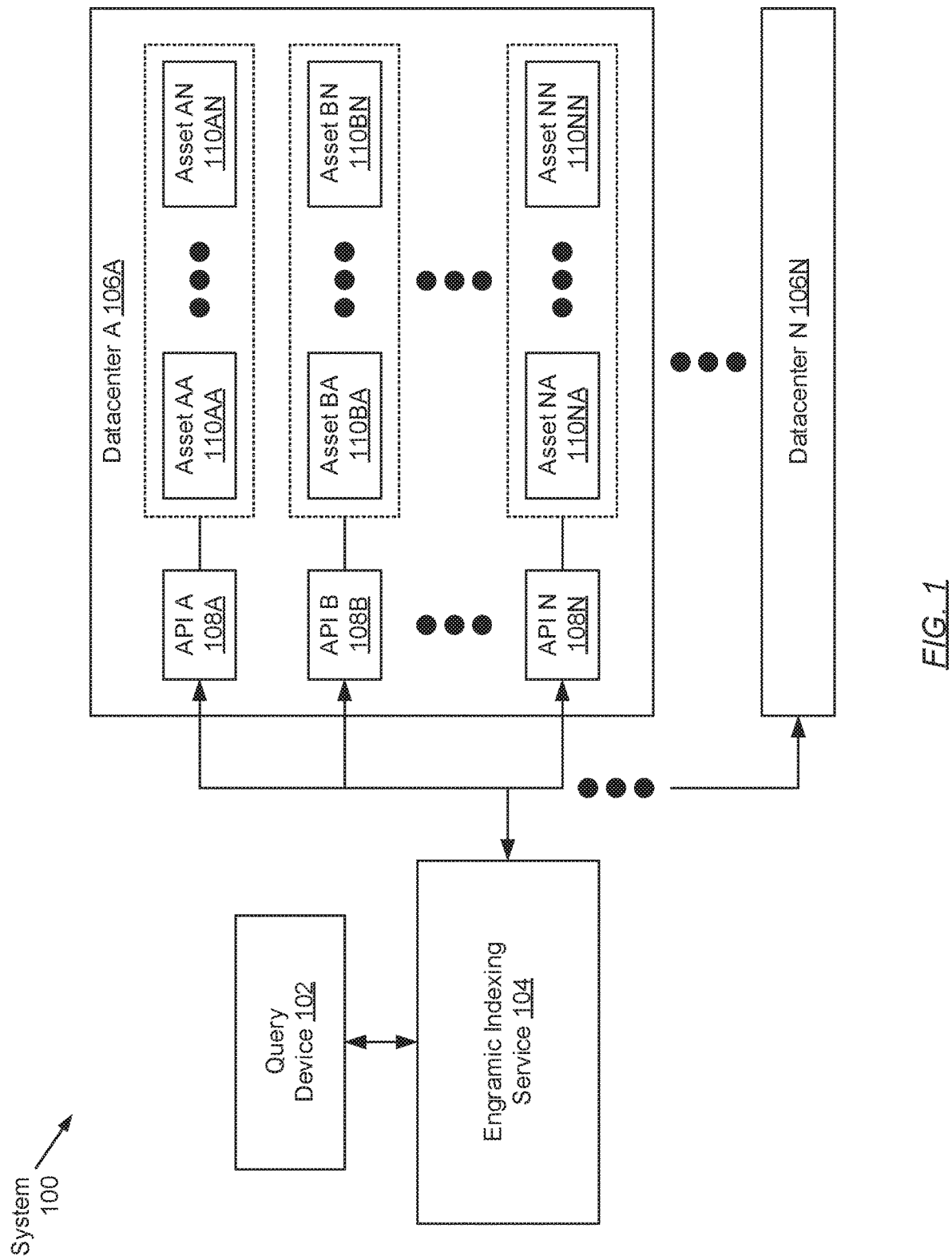
FIG. 1 shows a system in accordance with one or more embodiments of the invention.

FIG. 1 shows a system in accordance with one or more embodiments of the invention. The system (100) may include a query device (102), an engramic indexing service (104), and one or more datacenters (106A-106N). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled subcomponents (or systems) (e.g., switches, routers, gateways, etc.) that may facilitate communications between the above-mentioned system (100) components. Moreover, the above-mentioned system (100) components may communicate with one another using any combination of wired and/or wireless communication protocols.

In one embodiment of the invention, the query device (102) may represent any physical computing system whereby one or more users may pose queries (also referred to herein as input queries) and, subsequently, may receive resources (or information) best-fit to address the queries. To that extent, the query device (102) may include functionality to: capture input queries from users through speech and/or text; delegate the input queries to the engramic indexing service (104) for processing; receive resources (i.e., information through one or more forms or formats—e.g., text, images, speech, etc.) from the engramic indexing service (104), which may address the input queries; and provide the received resources to the users. One of ordinary skill will appreciate that the query device (102) may perform other functionalities without departing from the scope of the invention. Examples of the query device (102) may include, but are not limited to, a desktop computer, a laptop computer, a tablet computer, a smartphone, a smart speaker, or any other computing system similar to the exemplary computing system shown in FIG. 6.

In one embodiment of the invention, the engramic indexing service (104) may represent a natural language processing and semantics platform for accessing, searching, and/or managing enterprise-scale information technology infrastructure—e.g., the datacenter(s) (106A-106N)—of any given organization. To that extent, the engramic indexing service (104) may include functionality to: index resources available across the datacenter(s) (106A-106N) through semantic modeling (see e.g., FIG. 4); receive input queries from the query device (102); process the input queries using the semantically indexed resources (see e.g., FIGS. 5A and 5B), to identify and retrieve said resources from the datacenter(s) (106A-106N); and provide the retrieved resources to the query device (102) in response to the input queries. One of ordinary skill will appreciate that the engramic indexing service (104) may perform other functionalities without departing from the scope of the invention.

In one embodiment of the invention, the engramic indexing service (104) may be implemented using one or more computing servers (not shown). Each server may represent a physical server that may reside in a datacenter (i.e., one of the datacenter(s) (106A-106N) or a datacenter outside the given organization's enterprise-scale information technology infrastructure), or a virtual server that may reside in a cloud computing environment. Additionally or alternatively, the engramic indexing service (104) may be implemented using one or more computing systems similar to the exemplary computing system shown in FIG. 6. The engramic indexing service (104) is described in further detail below with respect to FIG. 2.

In one embodiment of the invention, a datacenter (106A-106N) may represent a facility wherein a given organization may centralize at least a portion of their information technology operations and resources (e.g., data, applications, and services). Further, a datacenter (106A-106N) may entail a configuration of various interconnected components (also referred to as assets (110AA-110NN)), which may work collectively to implement, support, and/or manage the aforementioned operations and resources. More specifically, an asset (110AA-110NN) may refer to any physical or logical component of a datacenter (106A-106N). Examples of physical assets (110AA-110NN) may include, but are not limited to, racks or chassis, servers, network switches or routers, storage devices, sensors, power supplying devices and/or grid, and cooling devices (e.g., fans). Meanwhile, examples of logical assets (110AA-110NN) may include, but are not limited to, virtual machines, containers, platforms, orchestrators, database services, data storage services, server-less or function-based electronic services, and any other services that may be implemented using one or more computing systems. An asset (110AA-110NN) may also include computing resources—e.g., processing resources such as central or graphics processing cores, storage and/or memory resources such as persistent or non-persistent storage/memory bytes, and networking resources such as network bandwidth—which may be provided by any physical component and, accordingly, may be requested, allocated, and consumed.

In one embodiment of the invention, access to at least the various resources managed by a datacenter (106A-106N) may be facilitated through one or more application programming interfaces (APIs) (108A-108N) (or more specifically, API endpoints) thereof. Each API (108A-108N) may represent a logical interface or interactivity protocol, which may be designed and configured to receive and fulfill resource requests for any of at least a subset of the resources managed at a host or local datacenter (106A-106N). That is, any given API (108A-108N) may be responsible for handling resource requests directed to a given subset of resources; and, accordingly, may include functionality to interact with an appropriate subset of assets (e.g., 110AA-110AN), which in turn may be implementing, supporting, and/or managing the given resource subset. Moreover, each API (108A-108N) may be assigned or associated with a unique digital location (e.g., a uniform resource locator (URL)) to where resource requests, for their respective subset of resources, may be delivered. By way of an example, an API (108A-108N) may particularly be configured to receive and address resource requests directed to virtual machines, metadata describing those virtual machines, and/or resources managed by those virtual machines, separately or in combination with other assets (110AA-110NN).

While FIG. 1 shows a configuration of components, other system (100) configurations may be used without departing from the scope of the invention. For example, in one embodiment of the invention, more than one query device (not shown) may operatively connect to the engramic indexing service (104).

Figure 2:
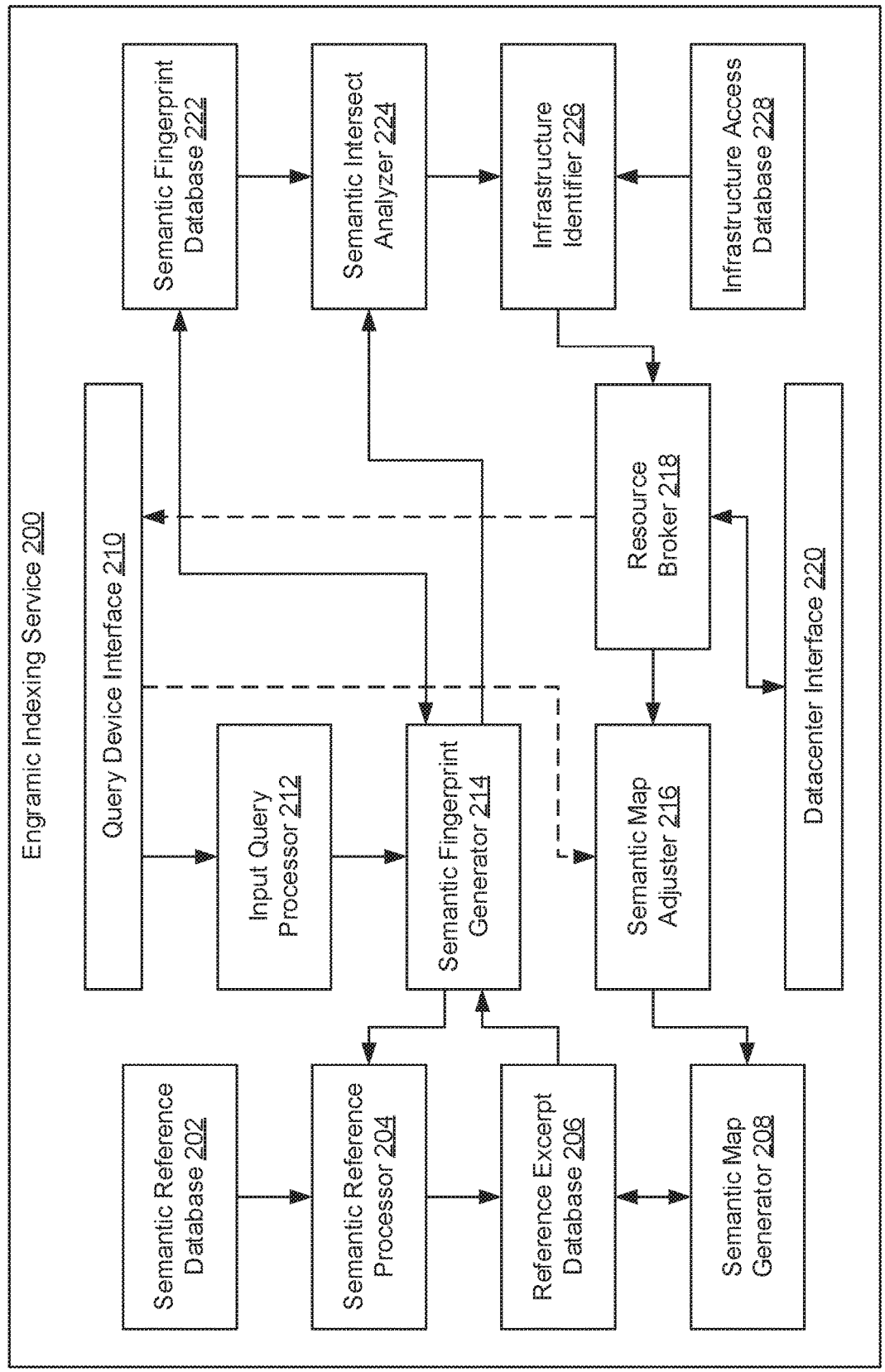
FIG. 2 shows an engramic indexing service in accordance with one or more embodiments of the invention.

FIG. 2 shows an engramic indexing service in accordance with one or more embodiments of the invention. The engramic indexing service (200) may include a semantic reference database (202), a semantic reference processor (204), a reference excerpt database (206), a semantic map generator (208), a query device interface (210), an input query processor (212), a semantic fingerprint generator (214), a semantic map adjuster (216), a resource broker (218), a datacenter interface (220), a semantic fingerprint database (222), a semantic intersect analyzer (224), an infrastructure identifier (226), and an infrastructure access database (228). Each of these engramic indexing service (200) subcomponents is described below.

In one embodiment of the invention, any or all databases (i.e., the semantic reference database (202), the reference excerpt database (206), the semantic fingerprint database (222), and/or the infrastructure access database (228)) of the engramic indexing service (200) may be implemented using one or more storage devices (not shown). Each storage device may encompass non-transitory computer readable storage media on which data may be stored in whole or in part, and temporarily or permanently. Further, each storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) based storage devices. Moreover, any subset or all of the storage device(s) may include persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the semantic reference database (202) may represent a data repository for storing semantic references. A semantic reference may encompass any source of information that may be encoded in or into textual data, in entirety or in part. The information disclosed in a semantic reference may be directed to describing any resource (or asset) that may be accessible, searchable, and/or managed by any datacenter (not shown) (see e.g., FIG. 1). Examples of semantic references may include, but are not limited to, confluence pages, architecture guides, emails, support tickets, conversation transcripts, images, videos, and any other form or format of data accessible through any non-transitory computer readable medium.

In one embodiment of the invention, the semantic reference processor (204) may represent a computer program that may execute on the underlying hardware of the engramic indexing service (200). Specifically, the semantic reference processor (204) may be designed and configured to transform the semantic references into semantic reference excerpts (described below). To that extent, the semantic reference processor (204) may include functionality to (for any given semantic reference): retrieve the semantic reference, which may be stored in the semantic reference database (202); clean the semantic reference of (or remove therefrom) any non-text elements; parse the cleaned semantic reference into slices of text—i.e., the semantic reference excerpts; and store the semantic reference excerpts in the reference excerpt database (206). One of ordinary skill will appreciate that the semantic reference processor (204) may perform other functionalities without departing from the scope of the invention.

In one embodiment of the invention, the reference excerpt database (206) may represent a data repository for storing semantic reference excerpts. A semantic reference excerpt may encompass a slice of text (i.e., a collection of words forming a portion of a sentence, or one or more sentences in entirety) from any cleaned semantic reference. Further, any given semantic reference excerpt may represent, disclose, or be directed to a single context (or semantic feature). A semantic feature may refer to an aspect definitive or descriptive of any resource (or asset) that may be accessible, searchable, and/or managed by any datacenter (not shown) (see e.g., FIG. 1). Examples of semantic features (for any given resource or asset) may include, but are not limited to, a particular geographic domain (e.g., a continent, a country, a region of a country, a city, an area of a city, etc.) associated with the resource/asset, a particular type (e.g., a rack or chassis, a server, a software program, a virtual machine, a storage device, etc.) associated with the resource/asset, and any other category as defined by a given organization, which may reflect any area of commonality or importance to the organization. Concerning these other categories, if an organization operates, for example, in the healthcare industry, then semantic features may be directed, but not limited to, areas of research, types of medical devices, hospital or other institutions, and specific medical issues. By way of another example, if an organization operates in the automotive industry, then semantic features may be directed, but not limited to, vehicle manufacturers, vehicle models, vehicle capabilities, vehicle engine types, etc.

In one embodiment of the invention, the semantic map generator (208) may represent a computer program that may execute on the underlying hardware of the engramic indexing service (200). Specifically, the semantic map generator (208) may be designed and configured to derive a semantic map from semantic reference excerpts. A semantic map may refer to a distribution of semantic reference excerpts (or more precisely, their representative semantic features), which may be encoded into a two-dimensional (2D) matrix of elements. Each element may be assigned a respective semantic feature and may be associated with a position in the 2D matrix reflecting a particular row and column thereof. Further, the semantic features may be distributed over the 2D matrix based on topic. That is, semantic features with similar topics (or sharing multiple common terms) may be arranged closer to one other, while semantic features with dissimilar topics (or sharing few common terms) may be arranged distant from one another. This resulting distribution of semantic features may be achieved through textual clustering—i.e., the application of cluster analysis to textual data, which may utilize machine learning and natural language processing techniques to categorize or group the textual data. Moreover, once generated by the semantic map generator (208), the semantic map may be stored alongside the semantic reference excerpts, from which the semantic map had been derived, in the reference excerpt database (206). Particularly, each semantic reference excerpt may be associated with the position (i.e., row and column indices) of an element of the 2D matrix to which their respective semantic feature may be encoded.

In one embodiment of the invention, the query device interface (210) may represent a logical interface or interactivity protocol, which may be designed and configured to facilitate communications between the engramic indexing service (200) and any query device (not shown) (see e.g., FIG. 1). To that extent, the query device interface (210) may include functionality to: receive input queries (e.g., audio or textual information) from a query device; delegate the input queries to the input query processor (212) for preliminary processing (described below); receive resources, which may or may not address the input queries, from the resource broker (218); provide the resources to the query device; receive feedback (i.e., information reflecting whether the resources properly addressed the input queries) from the query device; and delegate the feedback to the semantic map adjuster (216) for processing. One of ordinary skill will appreciate that the query device interface (210) may perform other functionalities without departing from the scope of the invention.

In one embodiment of the invention, the input query processor (212) may represent a computer program that may execute on the underlying hardware of the engramic indexing service (200). Specifically, the input query processor (212) may be designed and configured to convert input queries, if received in any spoken language or audio data format, into a textual data format. To that extent, the input query processor (212) may include functionality to: receive input queries from the query device interface (210); transcribe audio-formatted input queries into text-formatted input queries using any existing speech recognition or speech-to-text algorithm; and provide the text-format input queries to the semantic fingerprint generator (214) for processing. Should the input queries be already textually formatted when received from the query device interface (210), then the input query processor (212) may include further functionality to circumvent the data format conversion process and, subsequently, just provide the semantic fingerprint generator (214) with the received input queries. One of ordinary skill will appreciate that the input query processor (212) may perform other functionalities without departing from the scope of the invention.

In one embodiment of the invention, the semantic fingerprint generator (214) may represent a computer program that may execute on the underlying hardware of the engramic indexing service (200). Specifically, the semantic fingerprint generator (214) may be designed and configured to produce semantic fingerprints from any granularity of text (e.g., one or more words) and the semantic map (described above). A semantic fingerprint may refer to a semantic space representation of a given text granularity, which may be encoded into a 2D binary matrix (or bit-matrix) (also referred to as a sparse distributed representation). A semantic space may refer to the natural language universe (or domain) in which the engramic indexing service (200) may operate, which may be defined by the selected corpus of semantic references. The bit-matrix representative of any semantic fingerprint must be of the same dimensions as the 2D matrix representative of the generated semantic map.

In one embodiment of the invention, a semantic fingerprint for a single textual word (also referred to as a word semantic fingerprint) may be generated differently than a semantic fingerprint for multiple words (e.g., sentences, paragraphs, or any other grouping of words including whole documents or multiple documents). That is, when considering a single word, generation of a corresponding semantic fingerprint may entail: (i) initializing a bit-matrix representative of a blank semantic fingerprint, which may include a set of elements (or bits) each set to the binary digit zero; (ii) comparing the word against each semantic reference excerpt used in the generation of the semantic map; (iii) for each comparison, determining whether the word is recited in the given semantic reference excerpt; and (iv-a) if it is determined that the word is recited in the given semantic reference excerpt, then modifying the element value of the bit-matrix element assigned to the given semantic reference excerpt (or semantic feature thereof) from the existing binary digit zero to a binary digit one; or (iv-b) if it is alternatively determined that the word is not recited in the given semantic reference excerpt, then retaining the existing element value—i.e., binary digit zero—of the bit-matrix element assigned to the given semantic reference excerpt (or semantic feature thereof).

In one embodiment of the invention, when considering multiple words, generation of a corresponding semantic fingerprint may entail: (i) identifying every constituent word recited in the grouping of words; (ii) obtaining the word semantic fingerprint (described above) for each constituent word (which should have previously been generated), thereby obtaining a set of word semantic fingerprints; (iii) aggregating (i.e., stacking) the set of word semantic fingerprints to produce an aggregated semantic fingerprint; and (iv) sparsifying the aggregated semantic fingerprint (i.e., selecting a slice of the aggregated semantic fingerprint where a percentage of activated bits across the slice meets a defined low value—e.g., two percent) to obtain the semantic fingerprint for the grouping of words. Once generated by the semantic fingerprint generator (214), the semantic fingerprints, for single words or groupings of words alike, may be stored in the semantic fingerprint database (222).

In one embodiment of the invention, the semantic map adjuster (216) may represent a computer program that may execute on the underlying hardware of the engramic indexing service (200). Specifically, the semantic map adjuster (216) may be designed and configured to tune or update the distribution of semantic features representative of the semantic map (described above). To that extent, the semantic map adjuster (216) may include functionality to: receive query response feedback originating from a query device via query device interface (210); examine the query response feedback to identify whether the resources provided in response to an input query addressed the input query; and adjust the positions of the semantic features on the semantic map, based on the resources addressing or not addressing the input query, to obtain an updated semantic map. One of ordinary skill will appreciate that the semantic map adjuster (216) may perform other functionalities without departing from the scope of the invention.

In one embodiment of the invention, the resource broker (218) may represent a computer program that may execute on the underlying hardware of the engramic indexing service (200). Specifically, the resource broker (218) may be designed and configured to interact with one or more datacenters (or more specifically, the application programming interfaces (API) of the datacenter(s)) to access and retrieve resources that may address input queries received by the engramic indexing service (200) from a query device. To that extent, the resource broker (218) may include functionality to: generate resource requests based on the analyses of semantic fingerprints by the semantic intersect analyzer (224) (described below); receive infrastructure (e.g., datacenter and/or API) access information from the infrastructure identifier (226), where infrastructure access information may include, but is not limited to, a unique network address (e.g., uniform resource locator (URL)) assigned to infrastructure identified by the infrastructure identifier (226); transmit the generated resource requests, via the datacenter interface (220), to target infrastructure associated with (and using) the received infrastructure access information; receive, in response to the issued resource requests and via the datacenter interface (220), one or more resources from the target infrastructure; and provide, via the query device interface (210), the received resource(s) to a query device in response to an input query obtained therefrom. One of ordinary skill will appreciate that the resource broker (218) may perform other functionalities without departing from the scope of the invention.

In one embodiment of the invention, the datacenter interface (220) may represent a logical interface or interactivity protocol, which may be designed and configured to facilitate communications between the engramic indexing service (200) and any datacenter (not shown) (see e.g., FIG. 1). To that extent, the datacenter interface (220) may include functionality to: receive resource requests from the resource broker (218); transmit the resource requests to the appropriate datacenter(s) and/or datacenter API(s); receive resource responses including resources from one or more datacenters and/or datacenter APIs; and provide the resource responses to the resource broker (218) for processing. One of ordinary skill will appreciate that the datacenter interface (220) may perform other functionalities without departing from the scope of the invention.

In one embodiment of the invention, the semantic fingerprint database (222) may represent a data repository for storing semantic fingerprints (described above). Specifically, the semantic fingerprint database (222) may store two classes of semantic fingerprints: (a) semantic fingerprints for individual words (i.e., word semantic fingerprints); and (b) semantic fingerprints for word groupings each entailing more than one word. Further, with regard to the former class, the semantic fingerprint database (222) may store a word semantic fingerprint for each unique (individual) word recited across all semantic reference excerpts (stored in the reference excerpt database (206)) used in the generation of the semantic map. Semantic fingerprints for any word grouping (including any combination of these individual words) may be produced from the aforementioned collection of word semantic fingerprints.

In one embodiment of the invention, the semantic intersect analyzer (224) may represent a computer program that may execute on the underlying hardware of the engramic indexing service (200). Specifically, the semantic intersect analyzer (224) may be designed and configured to determine similarity between semantic fingerprints. To that extent, the semantic intersect analyzer (224) may include functionality to compute similarity metrics at least between pairs of semantic fingerprints. A similarity metric may measure the semantic closeness (or overlap) between compared semantic fingerprints. Further, by way of an example, the similarity metric may reflect a bit overlap percentage, which may indicate a ratio of activated bits (i.e., binary digit one) to the total number of bits located in the same position across the compared semantic fingerprints.

In one embodiment of the invention, the semantic intersect analyzer (224) may further include functionality to generate semantic fingerprint intersects, each of which may refer to a bit-matrix that reflects the bit overlap between compared semantic fingerprints. A semantic fingerprint intersect, subsequently, may highlight the activated semantic features common to the compared semantic fingerprints. Additionally, the semantic intersect analyzer (224) may include functionality to identify semantic clusters pronounced in semantic fingerprint intersects, or semantic clusters shared between compared semantic fingerprints. Identification of a given semantic cluster may entail identifying a set of semantic features, spatially proximal to one another on a semantic map and/or fingerprint, which collectively define the given semantic cluster and may be directed to a contextual classification, topic, or meaning associated with the given text granularity encoded by the semantic fingerprint. One of ordinary skill will appreciate that the semantic intersect analyzer (224) may perform other functionalities without departing from the scope of the invention.

In one embodiment of the invention, the infrastructure identifier (226) may represent a computer program that may execute on the underlying hardware of the engramic indexing service (200). Specifically, the infrastructure identifier (226) may be designed and configured to identify information technology infrastructure (e.g., datacenter(s) and/or datacenter application programming interface(s) (API)) to which resource requests are to be issued. To that extent, the infrastructure identifier (226) may include functionality to: receive one or more contextual classifications, topics, or meanings (mapped to one or more semantic clusters, respectively, on a given semantic fingerprint intersect, from the semantic intersect analyzer (224); receive one or more unique datacenter identifiers, which may be mapped to one or more selected datacenter semantic fingerprints (described below), respectively, based at least on bit overlapping or semantic similarity measured between compared semantic fingerprints, from the semantic intersect analyzer (224); perform lookups on the infrastructure access database (228) using the received classifications/topics/meanings and the unique datacenter identifiers, to identify one or more datacenter APIs and datacenters, respectively; and provide the access information (maintained in the infrastructure access database (228)) for the identified datacenter API(s) and/or datacenter(s) to the resource broker (218), to be used in the forwarding of resource requests over the network. One of ordinary skill will appreciate that the infrastructure identifier (226) may perform other functionalities without departing from the scope of the invention.

In one embodiment of the invention, the infrastructure access database (228) may represent a data repository for storing infrastructure access information. Infrastructure access information may refer to any information that may enable or facilitate the steering of resource requests to appropriate information technology infrastructure—e.g., a datacenter and/or a datacenter API (see e.g., FIG. 1). Examples of infrastructure access information may include, but are not limited to, Internet Protocol (IP) addresses, network interfaces or ports configured to receive the resource requests, uniform resource locators (URL), etc.

While FIG. 2 shows a configuration of subcomponents, other engramic indexing service (200) configurations may be used without departing from the scope of the invention.

Figure 3:
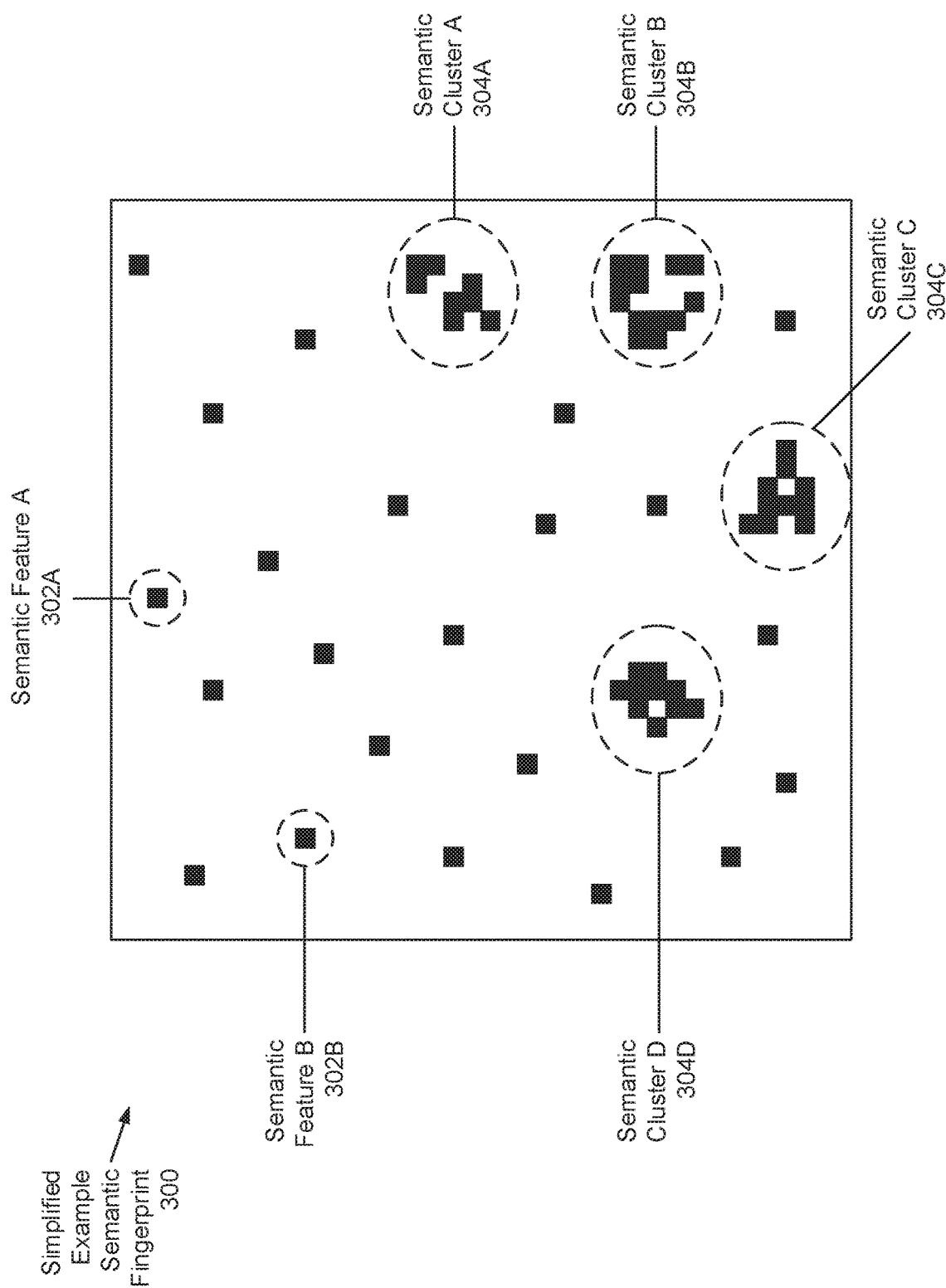
FIG. 3 shows a simplified example semantic fingerprint in accordance with one or more embodiments of the invention.

FIG. 3 shows a simplified example semantic fingerprint in accordance with one or more embodiments of the invention. A semantic fingerprint (300) may refer to a semantic space representation of a given text granularity, which may be encoded into a 2D binary matrix (or bit-matrix) (also referred to as a sparse distributed representation). Each element (or bit) of a semantic fingerprint (300) may be associated with or mapped to a given semantic feature (302A, 302B) (or context) recited as a semantic reference excerpt of a semantic reference (described above) (see e.g., FIG. 2) used to define the semantic space. Further, the distribution or position of the semantic features (302A, 302B) over the 2D bit-matrix may be determined through the application of textual clustering analysis (i.e., a machine learning technique) in combination with natural language processing. Effectively, semantic features are distributed such that semantic features with similar topics (or sharing multiple common terms) may be arranged closer to one other, while semantic features with dissimilar topics (or sharing few common terms) may be arranged distant from one another.

In one embodiment of the invention, within a semantic fingerprint (300), a given semantic feature (302A, 302N) may be shown as activated or deactivated. When activated, the bit mapped to the semantic feature (302A, 302N) may reflect a binary digit one (1) or ON value, whereas when deactivated, the bit mapped to the semantic feature (302A, 302B) may alternatively reflect a binary digit zero (0) or OFF value. Within a semantic fingerprint (300), only the activated semantic features (302A, 302B) may be significant and may, accordingly, be pronounced as non-white points throughout the semantic fingerprint (300).

Furthermore, in one embodiment of the invention, two or more semantic features (302A, 302B) may define a semantic cluster (304A-304D). Specifically, a semantic cluster (304A-304D) may refer to a set of semantic features (302A, 302B) more similar than different, and thus spatially proximal to one another on a semantic map (not shown) and/or a semantic fingerprint (300), which may collectively be directed to a contextual classification, topic, or meaning associated with the given text granularity encoded by the semantic fingerprint (300).

Figure 4:
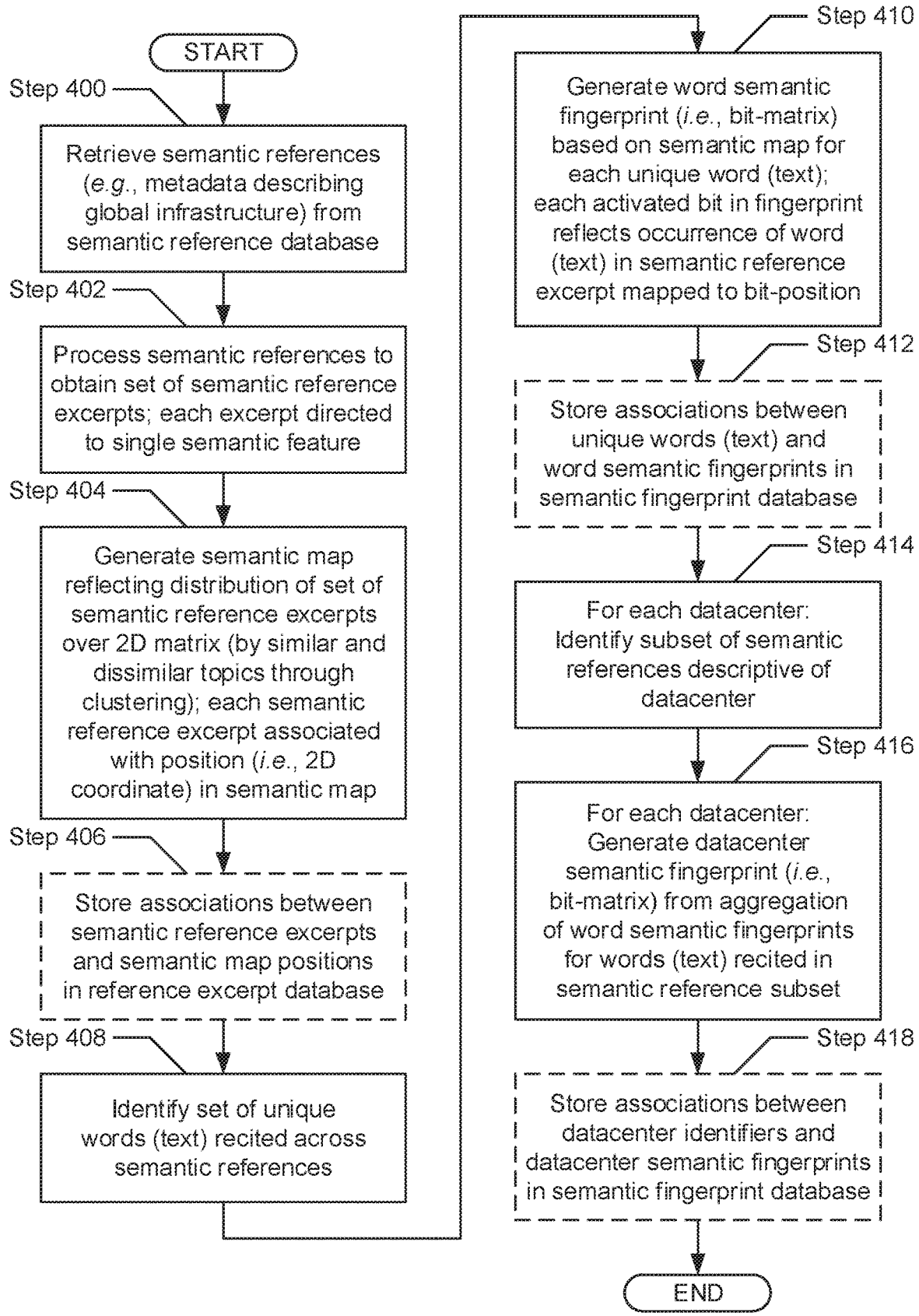
FIG. 4 shows a flowchart describing a method for generating datacenter semantic fingerprints in accordance with one or more embodiments of the invention.

FIG. 4 shows a flowchart describing a method for generating datacenter semantic fingerprints in accordance with one or more embodiments of the invention. The various steps outlined below may be performed by the engramic indexing service (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 4, in Step 400, semantic references are retrieved from a semantic reference database. In one embodiment of the invention, each semantic reference may represent a source of information pertaining to one or more resources and/or assets that may be accessible, searchable, and/or managed by any one or more datacenters for an organization.

In Step 402, the semantic references (retrieved in Step 400) are subsequently processed. In one embodiment of the invention, processing of the semantic references may entail cleaning (or removing) any and all non-textual elements (e.g., images, etc.) therefrom, and parsing (or segmenting) each semantic reference into a set of semantic reference excerpts. The latter operation may be performed so that each semantic reference excerpt represents, discloses, or directs to a single context (or semantic feature).

In Step 404, a semantic map is generated from the collection of semantic reference excerpts (obtained in Step 402). The semantic map may refer to a distribution of semantic reference excerpts (or more precisely, their representative semantic features), which may be encoded into a 2D matrix of elements. Each element may be assigned a respective semantic feature and may be associated with a position in the 2D matrix reflecting a particular row and column thereof. Further, the semantic features may be distributed over the 2D matrix based on topic through the application of textual cluster analysis and natural language processing.

In Step 406, information reflective of the semantic map (generated in Step 404) is stored. Particularly, in one embodiment of the invention, the element position (i.e., row and column indices) for each semantic feature, distributed across the semantic map, may be associated with and, thus stored alongside, a respective semantic reference excerpt stored in the reference excerpt database. In Step 408, a set of unique textual words is/are identified from across the corpus of semantic references.

In Step 410, a word semantic fingerprint is generated for each unique, textual word (identified in Step 408). In one embodiment of the invention, a semantic fingerprint may refer to a semantic space representation of a given text granularity, which may be encoded into a 2D binary matrix (or bit-matrix) (also referred to as a sparse distributed representation). Generation of any given word semantic fingerprint is described in further detail above (see e.g., FIG. 2).

In Step 412, the word semantic fingerprint (generated in Step 410) for each unique, textual word (identified in Step 408) is stored. Specifically, in one embodiment of the invention, each given word semantic fingerprint may be stored alongside their respective textual word within the semantic fingerprint database.

In Step 414, a subset of all semantic references (used in the generation of the semantic map in Step 404) is identified for each datacenter amongst the global information technology infrastructure for the organization. In one embodiment of the invention, each semantic reference, of an aforementioned semantic references subset for a given datacenter, may disclose any granularity of information pertaining to the datacenter, which may include, but is not limited to, datacenter metadata (e.g., geographical location information) describing the datacenter, an inventory of assets implementing the datacenter, asset metadata (e.g., type, version, capabilities, etc.) describing the assets, resources (e.g., data, applications, and/or services) maintained at the datacenter, and resource metadata (e.g., type, version, brief description, etc.).

In Step 416, a datacenter semantic fingerprint is generated for each datacenter amongst the global information technology infrastructure for the organization. In one embodiment of the invention, a datacenter semantic fingerprint (for a given datacenter) may be generated from the aggregation of various word semantic fingerprints. These word semantic fingerprints may map to individual textual words, each of which may be recited at least once throughout the semantic references subset (identified in Step 414) for the given datacenter. Further detail directed to the generation of semantic fingerprints for word groupings (e.g., a semantic references subset) is described above with respect to FIG. 2. In Step 418, the datacenters semantic fingerprint(s) (generated in Step 416) for the datacenter(s), respectively, is/are stored in the semantic fingerprint database.

Figure 5A:
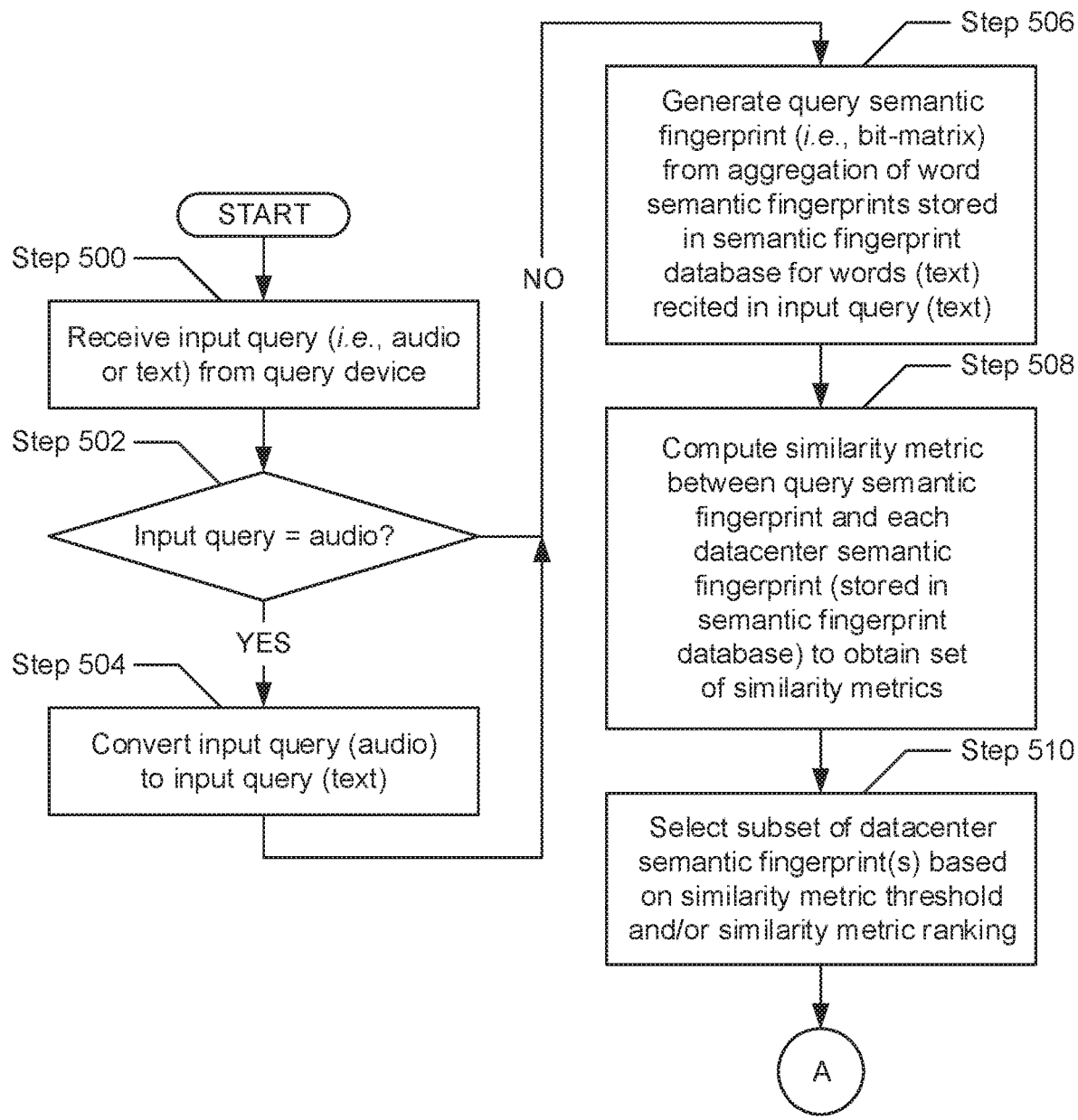
FIGS. 5A and 5B show a flowchart describing a method for processing input queries in accordance with one or more embodiments of the invention.
Figure 5B:
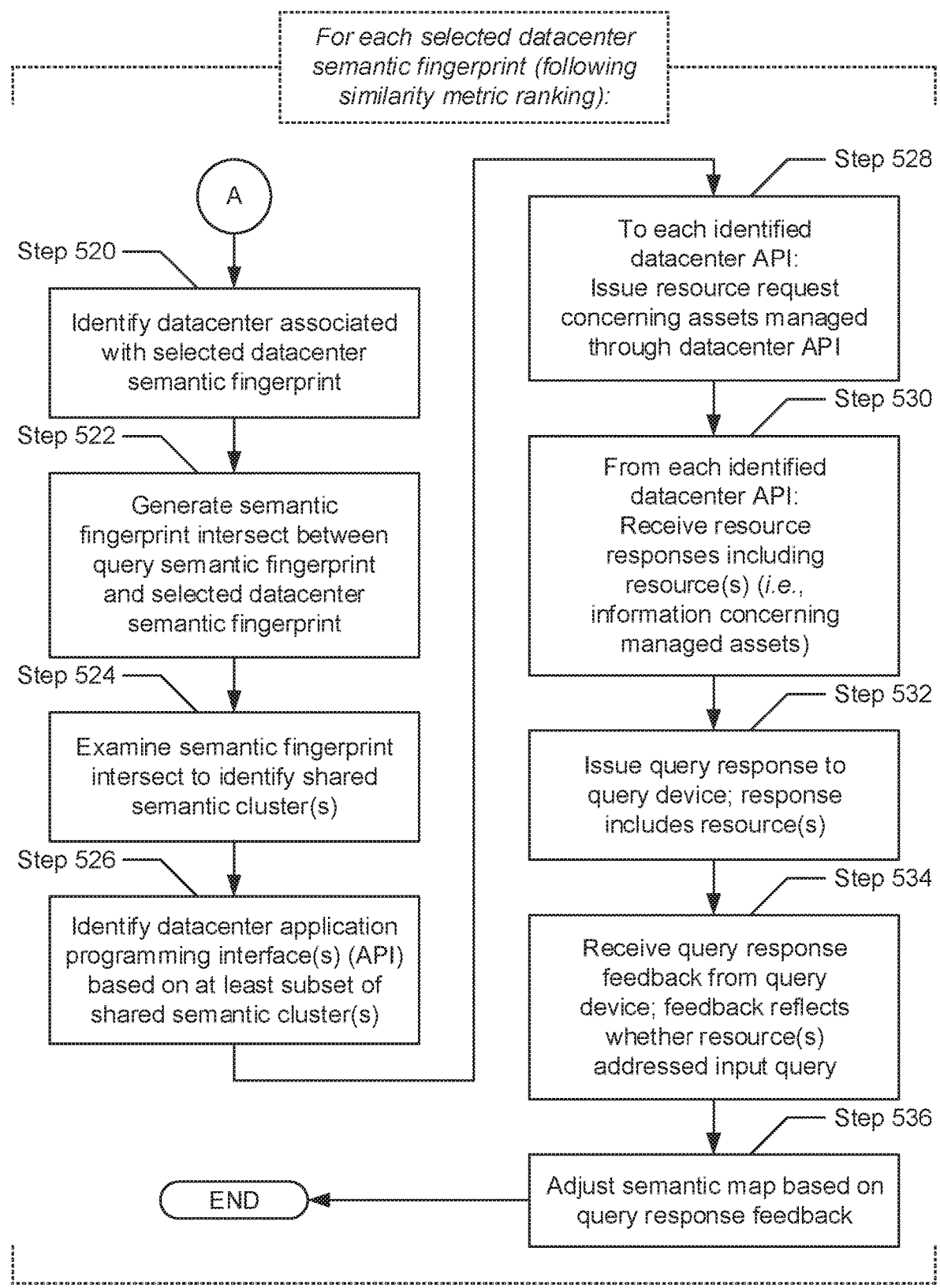

FIGS. 5A and 5B show a flowchart describing a method for processing input queries in accordance with one or more embodiments of the invention. The various steps outlined below may be performed by the engramic indexing service (see e.g., FIGS. 1 and 2). Further, while the various steps in the flowchart are presented and described sequentially, one of ordinary skill will appreciate that some or all steps may be executed in different orders, may be combined or omitted, and some or all steps may be executed in parallel.

Turning to FIG. 5A, in Step 500, an input query is received from a query device (see e.g., FIG. 1). In one embodiment of the invention, the input query may represent a request for information from one or more users (e.g., employees of an organization) operating the query device. Further, the requested information may be directed to any aspect (e.g., metadata, assets, resources, etc.) of the information technology infrastructure maintained by the organization. Moreover, the input query may be received in an audio/speech or textual data format.

In Step 502, a determination is made as to whether the input query (received in Step 500) arrived in an audio/speech data format. The determination may entail examining metadata (e.g., data format type) describing the input query. Subsequently, in one embodiment of the invention, if it is determined that the input query had been received in an audio/speech data format, then the process proceeds to Step 504. On the other hand, in another embodiment of the invention, if it is alternatively determined that the input query had been received in a textual data format, then the process alternatively proceeds to Step 506.

In Step 504, upon determining (in Step 502) that the input query (received in Step 500) arrived in an audio/speech data format, the input query is converted to a textual data format.

In one embodiment of the invention, the conversion process may entail the application of any existing speech recognition or speech-to-text technology.

In Step 506, a query semantic fingerprint is generated from the textual data-formatted input query (received in Step 500 or converted in Step 504). In one embodiment of the invention, the query semantic fingerprint may refer to a semantic space representation of the input query, which may be encoded into a 2D binary matrix (or bit-matrix) (also referred to as a sparse distributed representation). Further, the input query may encompass a collection or grouping of words and, accordingly, the query semantic fingerprint may be generated from the aggregation of word semantic fingerprints for the individual words, respectively, recited in the input query.

In Step 508, the query semantic fingerprint (generated in Step 506) is compared against each datacenter semantic fingerprint, of a collection of datacenter semantic fingerprints, maintained in the semantic fingerprint database. In one embodiment of the invention, a given datacenter semantic fingerprint may refer to a semantic space representation of the given datacenter, which may be encoded into a bit-matrix. Further, for each comparison, a similarity metric may be computed. The similarity metric may measure the semantic closeness (or overlap) between the query semantic fingerprint and a datacenter semantic fingerprint. Through a different perspective, the similarity metric may measure the likelihood (or probability) that the datacenter manages resources that may address the input query. By way of an example, the similarity metric may reflect a bit overlap percentage, which may indicate a ratio of activated bits (i.e., binary digit one) to the total number of bits located in the same position across both the query and datacenter semantic fingerprints.

In Step 510, one or more datacenter semantic fingerprints is/are selected based at least on a ranking of the similarity metrics (computed in Step 508). In one embodiment of the invention, the ranking may order the datacenter semantic fingerprint(s) from highest to lowest semantic closeness to the query semantic fingerprint (generated in Step 506). Further, a cardinality (or number) of the datacenter semantic fingerprints selected may be limited by a defined similarity metric threshold. That is, those datacenter semantic fingerprints selected may need to meet or exceed the defined similarity threshold.

Turning to FIG. 5B, the remaining steps (i.e., Step 520 through Step 536) yet to be described are to be performed for each datacenter semantic fingerprint (selected in Step 510). Processing of each datacenter semantic fingerprint accordingly may transpire serially or concurrently. That being said, in Step 520, a datacenter is identified. In one embodiment of the invention, the datacenter may be associated with (or mapped to) the current selected datacenter semantic fingerprint being considered.

In Step 522, a semantic fingerprint intersect is generated. In one embodiment of the invention, the semantic fingerprint intersect may refer to a bit-matrix that reflects the bit overlap between the query semantic fingerprint (generated in Step 506) and the current selected datacenter semantic fingerprint being considered. The semantic fingerprint intersect, subsequently, may highlight the activated semantic features common to both aforementioned semantic fingerprints.

In Step 524, the semantic fingerprint intersect (generated in Step 522) is examined to identify one or more shared semantic clusters. In one embodiment of the invention, a shared semantic cluster may refer to a semantic cluster (see e.g., FIG. 3) commonly pronounced in two or more semantic fingerprints. In turn, a semantic cluster may refer to a set of semantic features more similar than different, and thus spatially proximal to one another on a semantic map and/or fingerprint, which may be collectively be directed to a contextual classification, topic, or meaning associated with the given text granularity encoded by the semantic fingerprint. For example, a semantic cluster may be directed to a specific platform or location, and may be defined through the spatial proximity of various semantic features including, but not limited to, non-transitory computer readable media types associated with the specific platform/location, event localities and/or types, resource types, etc.

In Step 526, one or more datacenter application programming interfaces (API) is/are identified from the shared semantic cluster(s) (identified in Step 524). In one embodiment of the invention, a datacenter API may represent a logical interface or interactivity protocol, which may have access to an assigned subset of assets of, and accordingly, at least a portion of resources managed at, the datacenter with which the datacenter API may be associated. The asset(s) and/or resource(s), accessible to a given datacenter API, may pertain to an asset and/or resource classification, which may be mapped to the contextual classification, topic, or meaning defining a given (shared) semantic cluster. For example, a shared semantic cluster may encompass semantic features surrounding the topic of virtualization. Further, of the datacenter APIs for the datacenter (identified in Step 520), a given datacenter API may be known to have access to virtual machines (e.g., logical assets) and/or resources (e.g., data, applications, services, etc.) managed thereby. Accordingly, the aforementioned given datacenter API may be identified as an access point for assets and/or resources relevant to the topic of virtualization representative of the shared semantic cluster.

In Step 528, one or more resource requests is/are issued to the datacenter API(s) (identified in Step 526) associated with the datacenter (identified in Step 520). In one embodiment of the invention, each resource request may include context relevant to the input query (received in Step 500), which may assist a given datacenter API to search for and retrieve resources best-fit to address the input query. By way of an example, the included context may encompass one or more keywords, which may have been recited in the input query.

In Step 530, one or more resource responses is/are received from the datacenter API(s) (to which a resource request had been issued in Step 528). In one embodiment of the invention, the resource response(s) may each include resources best-fit to address the input query, which may have been identified or selected by the respective datacenter API. Thereafter, in Step 532, a query response is issued to the query device. In one embodiment of the invention, the query response may serve as a reply to the input query (received in Step 500), and may include the resources from the datacenter API(s) (received in Step 530).

In Step 534, query response feedback is received from the query device. In one embodiment of the invention, the query response feedback may serve as an indicator of whether the input query (received in Step 500) had been properly addressed by the resources (provided to the users via the query device in Step 532). Further, the query response feedback may be reflected through, for example, a rating system gauging an appropriateness or usefulness of the provided resources.

In Step 536, the semantic map is adjusted based on the query response feedback (received in Step 534). That is, in one embodiment of the invention, if the query response feedback reflects that the provided resources properly addressed the input query, then the semantic map may be adjusted to reinforce the semantic similarity amongst the semantic features leading to the correct identification of the provided resources. On the other hand, in another embodiment of the invention, if the query response feedback reflects that the provided resources improperly addressed the input query, then the semantic map may be adjusted to redistribute (or distance) the semantic features from one another that had led to the incorrect identification of the provided resources.

Figure 6:
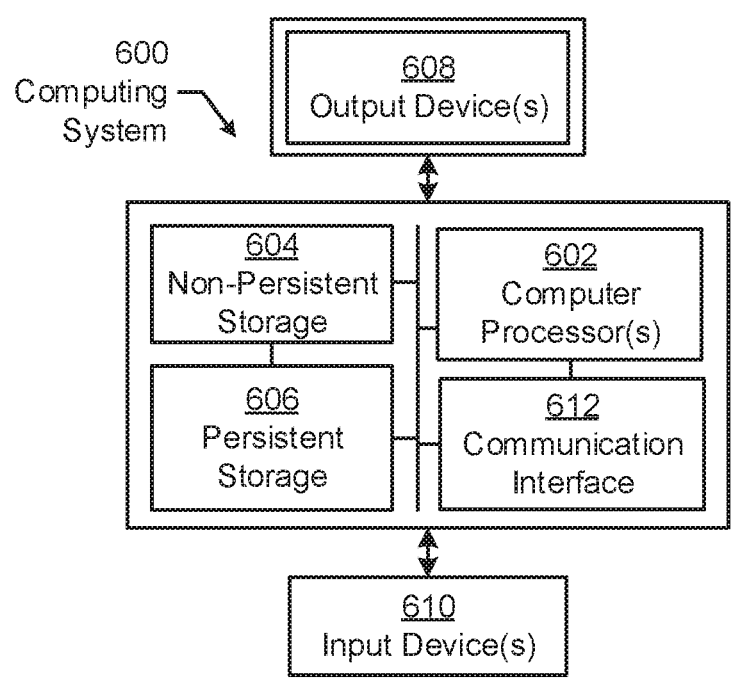
FIG. 6 shows an exemplary computing system in accordance with one or more embodiments of the invention.

FIG. 6 shows an exemplary computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a central processing unit (CPU) and/or a graphics processing unit (GPU). The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same as or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing queries, comprising:
receiving, by an engramic indexing service and from a query device, an input query comprising a plurality of words;
generating, by the engramic indexing service and for the input query, a query semantic fingerprint by:
obtaining a set of word semantic fingerprints corresponding to the plurality of words, wherein each word semantic fingerprint is encoded into a two dimensional binary matrix;
aggregating the set of word semantic fingerprints to produce an aggregated semantic fingerprint; and
sparsifying the aggregated semantic fingerprint to obtain the query semantic fingerprint, wherein sparsifying comprises applying textual clustering analysis in combination with natural language processing;
computing, by the engramic indexing service, a first similarity metric between the query semantic fingerprint and a first datacenter semantic fingerprint;
making, by the engramic indexing service, a first determination that the first similarity metric satisfies a similarity metric threshold;
identifying, by the engramic indexing service and based on the first determination, a first datacenter represented through the first datacenter semantic fingerprint; and
obtaining, by the engramic indexing service and in response to the input query, a first resource from the first datacenter,
wherein the query device, the engramic indexing service, and the datacenter are separate devices.

2. The method of claim 1, further comprising:
prior to identifying the first datacenter:
computing by the engramic indexing service, a second similarity metric between the query semantic fingerprint and a second datacenter semantic fingerprint;
making by the engramic indexing service, a second determination that the second similarity metric satisfies the similarity metric threshold; and
making by the engramic indexing service, a third determination that the first similarity metric ranks higher than the second similarity metric in a ranking of similarity metrics,
wherein identifying the first datacenter is further based on the third determination.

3. The method of claim 2, further comprising:
after obtaining the first resource:
providing the first resource to the query device;
receiving by the engramic indexing service, from the query device in response to providing the first resource, query response feedback indicating that the first resource did not address the input query;
identifying by the engramic indexing service, based on the query response feedback, a second datacenter represented through the second datacenter semantic fingerprint;
obtaining a second resource from the second datacenter; and
providing, in response to the input query, the second resource to the query device.

4. The method of claim 1, further comprising:
prior to obtaining resources from the first datacenter:
generating by the engramic indexing service, a semantic fingerprint intersect between the query semantic fingerprint and the first datacenter semantic fingerprint;

examining by the engramic indexing service, the semantic fingerprint intersect to identify a first semantic cluster;

identifying by the engramic indexing service, a first datacenter application programming interface (API) from the first semantic cluster; and issuing a first resource request to the first datacenter API of the first datacenter, wherein the first resource is obtained as a response to the first resource request.

5. The method of claim 4, wherein identifying the first datacenter API from the first semantic cluster, comprises:

identifying by the engramic indexing service, a set of activated semantic features defining the first semantic cluster;

mapping by the engramic indexing service, the set of activated semantic features to a topic, wherein the topic is associated with one selected from a group consisting of a first text granularity encoded by the query semantic fingerprint and a second text granularity encoded by the first datacenter semantic fingerprint; and mapping by the engramic indexing service, the topic to an asset of the first datacenter, wherein the first datacenter API manages access to the asset.

6. The method of claim 4, further comprising:

examining by the engramic indexing service, the semantic fingerprint intersect to identify a second semantic cluster;

identifying by the engramic indexing service, a second datacenter API from the second semantic cluster; and issuing by the engramic indexing service, a second resource request to the second datacenter API of the first datacenter, wherein a second resource is obtained as a response to the second resource request.

7. The method of claim 1, further comprising:

prior to receiving the input query:

obtaining by the engramic indexing service, a set of semantic references;

processing by the engramic indexing service, the set of semantic references to obtain a collection of semantic reference excerpts;

generating by the engramic indexing service, a semantic map from the collection of semantic reference excerpts;

generating by the engramic indexing service, based on the semantic map, the word semantic fingerprint for each unique word recited throughout the set of semantic references; and generating by the engramic indexing service, for each datacenter of a plurality of datacenters comprising the first datacenter, a datacenter semantic fingerprint through an aggregation of word semantic fingerprints.

8. The method of claim 7, further comprising:

providing the first resource to the query device;

receiving by the engramic indexing service, from the query device in response to providing the first resource, query response feedback indicating one selected from a group consisting of the first resource addressed the input query and the first resource did not address the input query; and adjusting by the engramic indexing service, the semantic map based on the query response feedback.

9. A non-transitory computer readable medium (CRM) comprising computer readable program code, which when executed by a computer processor, enables the computer processor to:

receive, by an engramic indexing service and from a query device, an input query comprising a plurality of words;

generate, by the engramic indexing service and for the input query, a query semantic fingerprint by:

obtaining a set of word semantic fingerprints corresponding to the plurality of words, wherein each word semantic fingerprint is encoded into a two dimensional binary matrix;

aggregating the set of word semantic fingerprints to produce an aggregated semantic fingerprint; and sparsifying the aggregated semantic fingerprint to obtain the query semantic fingerprint, wherein sparsifying comprises applying textual clustering analysis in combination with natural language processing;

compute, by the engramic indexing service, a first similarity metric between the query semantic fingerprint and a first datacenter semantic fingerprint;

make, by the engramic indexing service, a first determination that the first similarity metric satisfies a similarity metric threshold;

identify, by the engramic indexing service and based on the first determination, a first datacenter represented through the first datacenter semantic fingerprint; and obtain, by the engramic indexing service and in response to the input query, a first resource from the first datacenter, wherein the query device, the engramic indexing service, and the datacenter are separate devices.

10. The non-transitory CRM of claim 9, comprising computer readable program code, which when executed by the computer processor, further enables the computer processor to:

prior to identifying the first datacenter:

compute by the engramic indexing service, a second similarity metric between the query semantic fingerprint and a second datacenter semantic fingerprint;

make by the engramic indexing service, a second determination that the second similarity metric satisfies the similarity metric threshold; and make by the engramic indexing service, a third determination that the first similarity metric ranks higher than the second similarity metric in a ranking of similarity metrics, wherein identifying the first datacenter is further based on the third determination.

11. The non-transitory CRM of claim 10, comprising computer readable program code, which when executed by the computer processor, further enables the computer processor to:

after obtaining the first resource:

provide the first resource to the query device;

receive by the engramic indexing service, from the query device in response to providing the first resource, query response feedback indicating that the first resource did not address the input query;

identify by the engramic indexing service, based on the query response feedback, a second datacenter represented through the second datacenter semantic fingerprint;

obtain a second resource from the second datacenter; and provide, in response to the input query, the second resource to the query device.

12. The non-transitory CRM of claim 9, comprising computer readable program code, which when executed by the computer processor, further enables the computer processor to:
prior to obtaining resources from the first datacenter:
generate by the engramic indexing service, a semantic fingerprint intersect between the query semantic fingerprint and the first datacenter semantic fingerprint;
examine by the engramic indexing service, the semantic fingerprint intersect to identify a first semantic cluster;
identify by the engramic indexing service, a first datacenter application programming interface (API) from the first semantic cluster; and
issue by the engramic indexing service, a first resource request to the first datacenter API of the first datacenter, wherein the first resource is obtained as a response to the first resource request.

13. The non-transitory CRM of claim 12, wherein to identify the first datacenter API from the first semantic cluster, the computer readable program code, which when executed by the computer processor, enables the computer processor to:
identify by the engramic indexing service, a set of activated semantic features defining the first semantic cluster;
map by the engramic indexing service, the set of activated semantic features to a topic, wherein the topic is associated with one selected from a group consisting of a first text granularity encoded by the query semantic fingerprint and a second text granularity encoded by the first datacenter semantic fingerprint; and
map by the engramic indexing service, the topic to an asset of the first datacenter,
wherein the first datacenter API manages access to the asset.

14. The non-transitory CRM of claim 12, comprising computer readable program code, which when executed by the computer processor, further enables the computer processor to:
examine by the engramic indexing service, the semantic fingerprint intersect to identify a second semantic cluster;
identify by the engramic indexing service, a second datacenter API from the second semantic cluster; and
issue by the engramic indexing service, a second resource request to the second datacenter API of the first datacenter,
wherein a second resource is obtained as a response to the second resource request.

15. The non-transitory CRM of claim 9, comprising computer readable program code, which when executed by the computer processor, further enables the computer processor to:
prior to receiving the input query:
obtain by the engramic indexing service, a set of semantic references;
process by the engramic indexing service, the set of semantic references to obtain a collection of semantic reference excerpts;
generate by the engramic indexing service, a semantic map from the collection of semantic reference excerpts;
generate, by the engramic indexing service, based on the semantic map, the word semantic fingerprint for each unique word recited throughout the set of semantic references; and
generate, by the engramic indexing service, for each datacenter of a plurality of datacenters comprising the first datacenter, a datacenter semantic fingerprint through an aggregation of word semantic fingerprints.

16. The non-transitory CRM of claim 15, comprising computer readable program code, which when executed by the computer processor, further enables the computer processor to:
provide the first resource to the query device;
receive by the engramic indexing service, from the query device in response to providing the first resource, query response feedback indicating one selected from a group consisting of the first resource addressed the input query and the first resource did not address the input query; and
adjust by the engramic indexing service, the semantic map based on the query response feedback.

17. A system, comprising:
a plurality of datacenters; and
an engramic indexing service operatively connected to the plurality of datacenters and comprising a first computer processor,
wherein the engramic indexing service is programmed to:
receive an input query comprising a plurality of words;
generate, for the input query, a query semantic fingerprint by:
obtaining a set of word semantic fingerprints corresponding to the plurality of words, wherein each word semantic fingerprint is encoded into a two dimensional binary matrix:
aggregating the set of word semantic fingerprints to produce an aggregated semantic fingerprint; and
sparsifying the aggregated semantic fingerprint to obtain the query semantic fingerprint, wherein sparsifying comprises applying textual clustering analysis in combination with natural language processing;
compute a similarity metric between the query semantic fingerprint and a datacenter semantic fingerprint;
make a determination that the similarity metric satisfies a similarity metric threshold;
identify, based on the determination, a datacenter of the plurality of datacenters, represented through the datacenter semantic fingerprint; and
obtain, in response to the input query, a resource from the datacenter.

18. The system of claim 17, wherein the datacenter comprises at least one datacenter application programming interface (API).

19. The system of claim 18, wherein the datacenter further comprises a plurality of assets accessible through the at least one datacenter API.

20. The system of claim 17, further comprising:
a query device operatively connected to the engramic indexing service and comprising a second computer processor,
wherein the input query is received from the query device.

* * * * *